United States Patent
Lassini et al.

(10) Patent No.: US 10,090,953 B2
(45) Date of Patent: Oct. 2, 2018

(54) METHOD AND SYSTEM TO ADD AND COMMUNICATE WITH REMOTE TERMINAL ADDRESSES BEYOND A STANDARD BUS PROTOCOL

(71) Applicant: GE Aviation Systems LLC, Grand Rapids, MI (US)

(72) Inventors: Stefano Angelo Mario Lassini, Lowell, MI (US); Rusty Jay Benmark, Lowell, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 151 days.

(21) Appl. No.: 14/465,039

(22) Filed: Aug. 21, 2014

(65) Prior Publication Data
US 2016/0056906 A1 Feb. 25, 2016

(51) Int. Cl.
H04J 3/16 (2006.01)
H04L 12/40 (2006.01)
H04L 29/06 (2006.01)
H04L 12/403 (2006.01)

(52) U.S. Cl.
CPC .......... *H04J 3/1694* (2013.01); *H04L 12/403* (2013.01); *H04L 2012/4028* (2013.01)

(58) Field of Classification Search
None
See application file for complete search history.

(56) References Cited

U.S. PATENT DOCUMENTS

| 3,749,842 | A | * | 7/1973 | Poretti | H04L 5/245 370/301 |
| 4,554,657 | A | * | 11/1985 | Wilson | H04L 12/40019 370/364 |
| 4,837,788 | A | * | 6/1989 | Bird | H04L 12/46 178/71.1 |

(Continued)

OTHER PUBLICATIONS

MIL-STD-1553—, military standard published by the United States Department of Defense, Retrieved from "http://en.wikipedia.org/w/index.php?title=MIL-STD-1553&oldid=617158197", dated Aug. 1, 2014.

(Continued)

*Primary Examiner* — Kevin C Harper
*Assistant Examiner* — Derrick V Rose
(74) *Attorney, Agent, or Firm* — GE Aviation Systems LLC; William Andes

(57) ABSTRACT

A method of messaging in a communication system that operates in accordance with a standard protocol limited in the number of uniquely addressable remote terminals by a message frame that sequences the messages into a limited number of time slots includes redefining the message frame into a plurality of major frames. Each major frame includes at least one minor frame occupying a unique time slot to address a unique remote terminal. Messages are sequenced into the at least one minor frame. Each minor frame includes a set of time-division multiplexed messages. Each message in the set includes an address field identifying the address of a remote terminal and an additional message to each major frame encoding an output path. The output path encoded in each major frame and the unique time slot in the minor frame determines which remote terminal is addressed by the message.

16 Claims, 4 Drawing Sheets

(56) References Cited

U.S. PATENT DOCUMENTS

| | | | |
|---|---|---|---|
| 5,408,228 A | 4/1995 | Wnendt et al. | |
| 6,195,768 B1 | 2/2001 | Green | |
| 7,515,998 B1* | 4/2009 | Stiffler | G01S 7/003 244/75.1 |
| 8,542,719 B2 | 9/2013 | Lassini et al. | |
| 2009/0117930 A1* | 5/2009 | Purcell | H04W 84/08 455/518 |
| 2011/0310905 A1* | 12/2011 | Yu | G06F 13/00 370/401 |

OTHER PUBLICATIONS

MIL-STD-1553 Designer's Guide, Sixth Edition, published by Data Device Corporation, retrieved at World Wide Web:http://www.ddc-web.com, dated Dec. 8, 2003.

A European Search Report and Opinion issued in connection with corresponding EP Application No. 15181216.1 dated Jan. 7, 2016.

\* cited by examiner

METHOD AND SYSTEM TO ADD AND COMMUNICATE WITH REMOTE TERMINAL ADDRESSES BEYOND A STANDARD BUS PROTOCOL

BACKGROUND OF THE INVENTION

MIL-STD-1553 is military standard published by the United States Department of Defense that defines the mechanical, electrical and functional characteristics of a serial data bus. It was originally designed for use with military avionics, but has also become commonly used in spacecraft on-board data handling (OBDH) subsystems, both military and civil. It features a dual redundant balanced line physical layer, a (differential) network interface, time division multiplexing, half-duplex command/response protocol and up to 31 remote terminals (devices).

As shown in FIG. 1, a conventional MIL-STD-1553 bus system includes a dual-redundant MIL-STD-1553 bus 14, a bus controller 10, up to thirty-one remote terminals 12 (three remote terminals 12 are represented in FIG. 1), and an optional bus monitor 16. There is only one bus controller 10 in any MIL-STD-1553-based system, and it initiates all message communication over the bus. The bus controller 10 operates according to a command list stored in its local memory, commands the various remote terminals 12 to send or receive messages, and services any requests that it receives from the remote terminals 12. The bus controller 10 also detects and recovers from errors and keeps a history of errors. A remote terminal 12 can be used to provide an interface between the MIL-STD-1553 bus 14 and an attached subsystem. For example, in a tracked vehicle, a remote terminal 12 might acquire data from an inertial navigational subsystem, and send that data over the MIL-STD-1553 bus 14 to another remote terminal 12, for display on a crew instrument. Simpler examples of remote terminals 12 might be interfaces that switch on the headlights, the landing lights, or the annunciators in an aircraft.

When components are disconnected from the MIL-STD-1553 bus 14, or an equivalent bus, (resulting in an unterminated remote terminal, or open port), interference is created in the bus. For example, in the scenario where the bus 14 is used to communicate with stores on board an aircraft, such as ordinance (e.g., missiles) carried on an aircraft, and the ordinance is utilized (e.g., fired, dropped, etc.), there is a connector (previously connected to the missile) that is no longer connected to anything. As a result, signals sent down the bus 14 to this connector may propagate or reflect back along the bus 14 upon reaching the open connector, creating interference.

Conventionally, MIL-STD-1553 data bus systems are limited to a linear topology. In other words, a non-linear topology, such as a star topology or a parallel topology, is not compatible with a MIL-STD-1553 bus system. As a result, the MIL-STD-1553 system is not compatible, for example, with the use of a carriage system of deploying weapons in which a single carriage store interface (CSI) on the bus 14 is used to communicate with multiple weapons or a single CSI on the bus is used to communicate with multiple remote terminals 12. Thus, a one-to-more than one or a one-to-many connection topology is not compatible with the conventional MIL-STD-1553 system or its equivalents.

U.S. Pat. No. 8,542,719 Lassini et al., the disclosure of which is hereby incorporated by reference in its entirety, discloses a repeater coupled to a main bus that extends the bus system to elements outside of the linear topology. This extensibility includes enabling the repeater to be connectable to one or more remote terminals as well as a repeated bus. The repeated bus is configured in accordance with the same standard as the main bus, such as MIL-STD-1553. The repeated bus, like main bus, also can have remote terminals coupled to it. The repeater is configured to provide messages to each of the elements that are connected to the main bus through the repeater.

However, some ground-based and airborne applications that use networks such as MIL-STD-1553 require more than 31 devices to be connected to the network. An example of such an application is a high capacity stores management system where the bus controller must be able to independently address and communicate with a large number of munitions. Another example is a retrofit application where new equipment needs to be installed in specific aircraft locations served by a MIL-STD-1553 bus which would cause the bus to exceed the maximum number of RTs (31). While the repeater described above defines a mechanism that effectively expands the address space on the bus by extending the network topology thereby allowing the connection of more than 31 remote terminals on a MIL-STD-1553 bus system augmented with a repeated bus, it does not describe how the number of remote terminals connected to a single MIL-STD-1553 bus can be arbitrarily expanded while maintaining compatibility with the standard protocol.

BRIEF DESCRIPTION OF THE INVENTION

One aspect of the invention relates to a method of messaging in a communication system comprising a bus controller and a plurality of remote terminals each with an address, wherein the bus controller and the plurality of remote terminals are communicatively interconnected by a serial bus that operates in accordance with a standard protocol limited in the number of uniquely addressable remote terminals by a message frame that sequences the messages into a limited number of time slots. The method comprises redefining the message frame into a plurality of major frames, each major frame comprising at least one minor frame occupying a unique time slot within the major frame to address a unique remote terminal; sequencing the messages into the at least one minor frame in each major frame wherein each at least one minor frame comprises a set of time-division multiplexed messages; each message in the set including an address field identifying the address of a remote terminal to which the message is directed; and adding an additional message to each major frame encoding an output path. The output path encoded in each major frame and the unique time slot in the at least one minor frame determines which remote terminal is addressed by the message.

Another aspect of the invention relates to a communication system. The communication system comprises a serial bus that operates in accordance with a standard protocol limited in the number of uniquely addressable remote terminals by a message frame that sequences the messages into a limited number of time slots; at least one remote terminal coupled to the bus and configured to send and receive messages on the bus; a repeater coupled to the bus and configured to send and receive messages on the bus; at least one remote terminal coupled to the repeater and configured to send and receive messages on the bus via the repeater; and a bus controller coupled to the bus and configured to redefine the message frame into a plurality of major frames, each major frame comprising at least one minor frame occupying a unique time slot within the major frame to address a unique remote terminal; sequence the messages into the at least one minor frame in each major frame wherein each at least one minor frame comprises a set of time-division multiplexed messages, each message in the set including an address field identifying the address of a remote terminal to which the message is directed; and add an additional message to each major frame encoding an output path. The output path encoded in each major frame and the unique time slot in the at least one minor frame determines which remote terminal is addressed by the message.

DESCRIPTION OF EMBODIMENTS OF THE INVENTION

Figure 1:
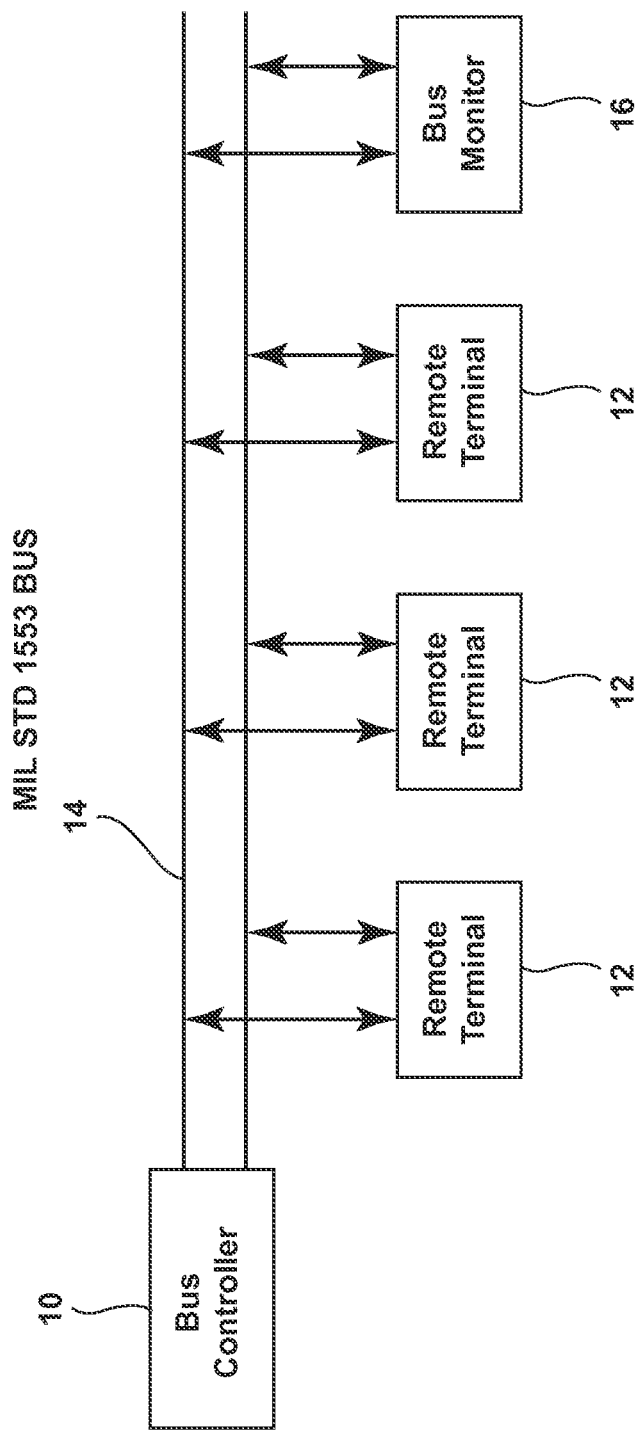
FIG. 1 is a prior art block diagram of a conventional MIL-STD-1553 bus system.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include decreasing both the hardware and software complexity of a bus controller, as well as the amount of wiring required to implement the network. In retrofit applications, technical effects may include eliminating the installation of additional new busses and bus controllers along with the resources required to rewire the aircraft or redesign existing systems.

Figure 2:
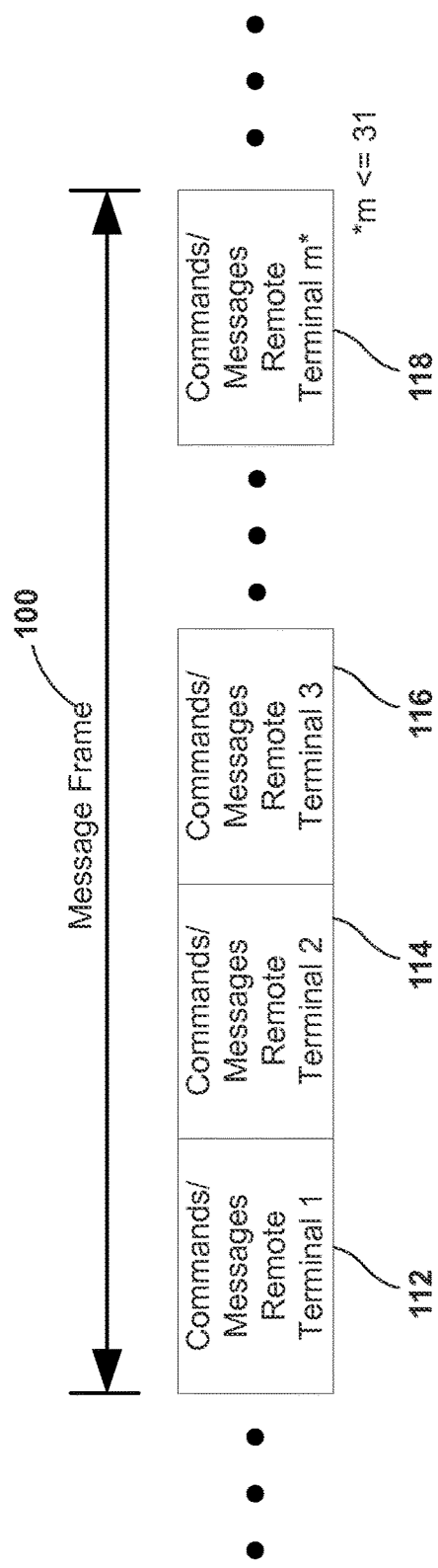
FIG. 2 illustrates a message frame on a MIL-STD-1553 bus system.

Referring now to FIG. 2, an implementation of a sequence of messages for a MIL-STD-1553 bus is shown. At any given time, a MIL-STD-1553 bus (or similar bus system such as SAE AS5652) has a single bus controller controlling the messaging on the bus. During operation, the bus controller may address up to 31 remote terminals using a command/response protocol. Typically, each remote terminal is assigned an address on the bus. The protocol provides an address field in the command/message structure such that each of the remote terminals can determine when a message or command is being addressed to it.

Typical implementations organize the messages such that there is a sequence of messages sent by the bus controller to all of the remote terminals on the bus. The sequence of messages occurs repeatedly, unless there is an error condition, or a need for an aperiodic message to be sent. A sequence of messages is referred to herein as a message frame 100. The message frame 100 is divided into time slots such that commands and messages addressed to a first remote terminal occur in a first time slot 112, commands and messages addressed to a second remote terminal occur in a second time slot 114, commands and messages addressed to a third remote terminal occur in a third time slot 116. In this way, each message frame 100 includes m unique time slots concluding with a final time slot 118 where m corresponds to the number of addressable remote terminals.

Figure 3:
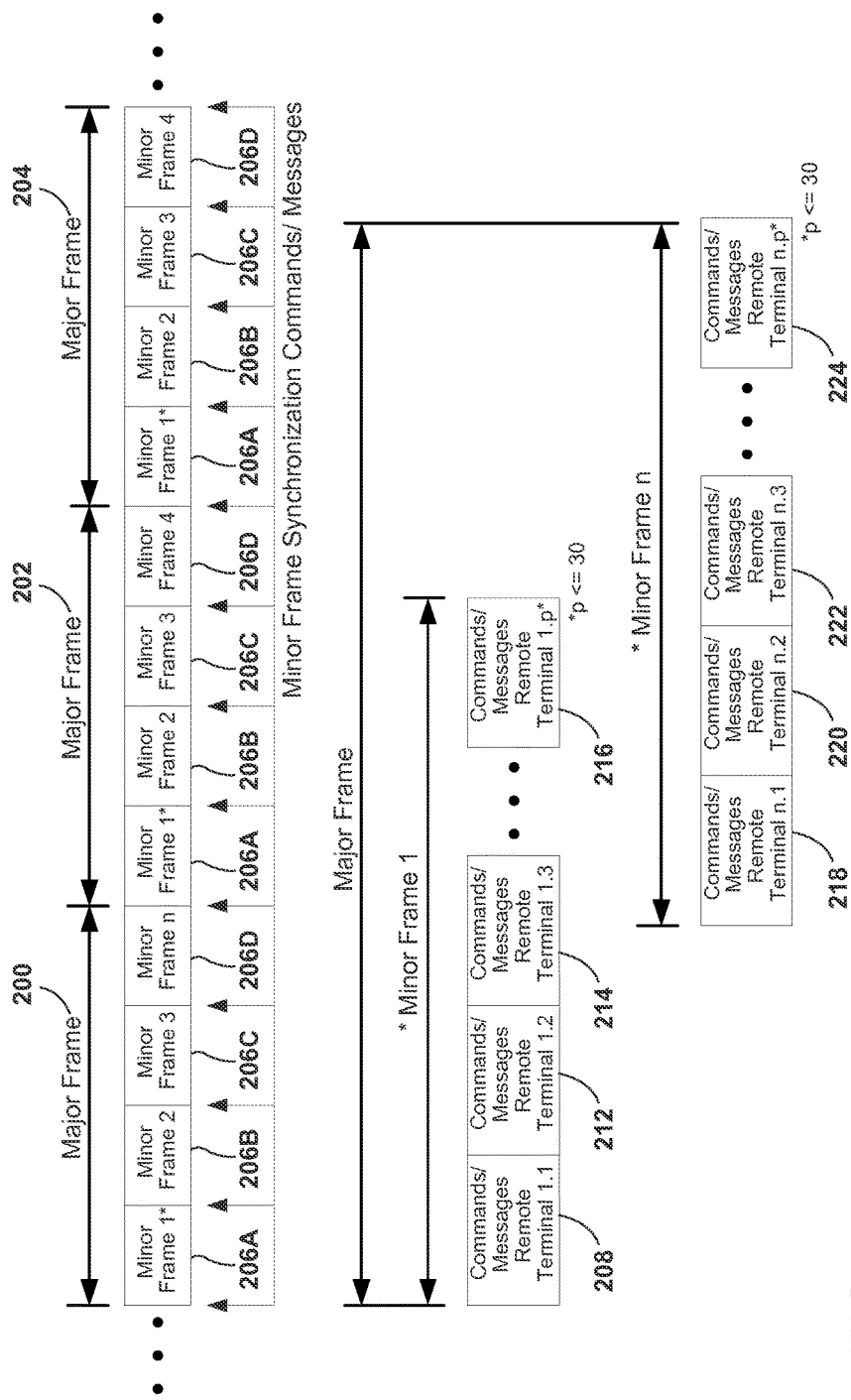
FIG. 3 illustrates a tiered messaging system on a MIL-STD-1553 bus system with virtual addressing according to an embodiment of the present invention.

As shown in FIG. 3, a method of expanding the number of addressable remote terminals according to an embodiment of the invention may include redefining a message frame as a major frame 200, 202, 204. Then each major frame 200, 202, 204 may include one or more minor frames 206. Each minor frame 206 occupies a unique time slot within the major frame.

A minor frame 206A includes the commands and messages addressed to a remote terminal. Similar to the time slots within a message frame, each minor frame 206 addresses a unique remote terminal. However, the address of the remote terminal is not necessarily unique. That is, multiple remote terminals may have the same 5-bit address. Instead, each minor frame 206A-D may address a subset of the remote terminals connected to the bus. For example, a first minor frame 206A may include time slots for addressing a first set of 30 remote terminals and a second minor frame 206B may include time slots for addressing a second set of 30 remote terminals. As shown in FIG. 3, for n minor frames where n=4, the bus controller may address 120 remote terminals with commands and messages in each major frame 200, 202, 204 and repeatedly addressable at the rate at which major frames are broadcast. In this way, the messaging protocol virtually addresses the remote terminals by combining a time synchronized marker (i.e. the time-slotting system) with a local remote terminal address to expand the total number of addressable remote terminals communicatively connected on the bus.

Remote terminals with the same address are slotted to different minor frames. For example, a first remote terminal with address 0x01 may be slotted in a first minor frame 206A in a first time slot 208 and a second remote terminal also with address 0x01 may be slotted in a second minor frame 206D in a second time slot 218. Remote terminals with identical addresses may be similarly time-multiplexed such that pairs of identically addressed remote terminals in minor frames 206A and 206D include remote terminals addressed 0x02 for time slots 212 and 220, remote terminals addressed 0x03 for time slots 214 and 222 continuing to remote terminals addressed p for time slots 216 and 224 where p=0x1E.

Figure 4:
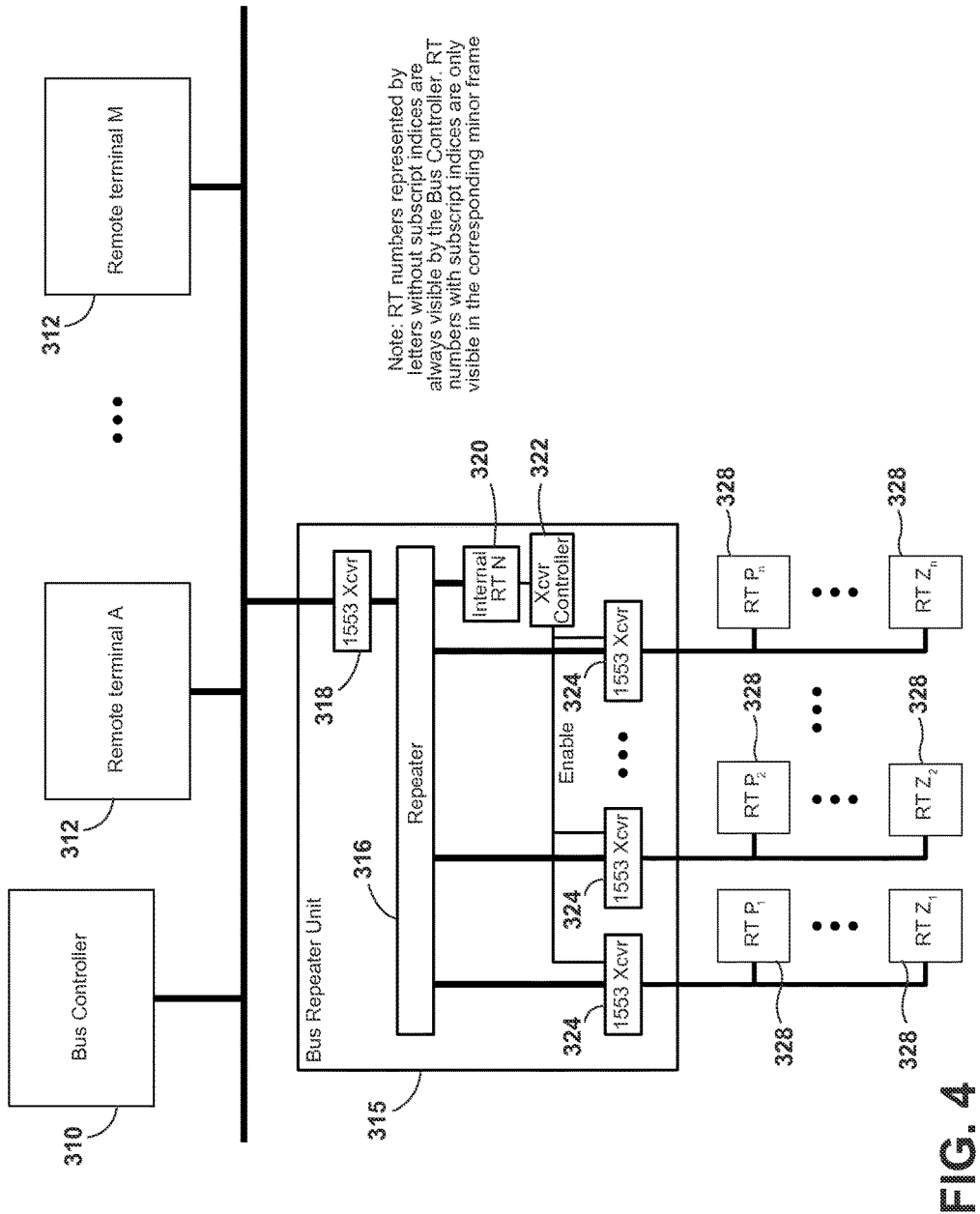
FIG. 4 is a block diagram of a MIL-STD-1553 bus system with virtual addressing according to an embodiment of the present invention.

Referring now to FIG. 4, a bus system including a repeater incorporating a virtual addressing protocol according to an embodiment of the invention is shown. As described above, a MIL-STD-1553 bus system includes a bus controller 310, remote terminals 312 and a MIL-STD-1553 bus 314. Also, as described above with reference to U.S. Pat. No. 8,542,719 Lassini et al., a repeater 316 may be in communication with the bus controller 310 and remote terminals 312 via the MIL-STD-1553 bus 314. As shown, some of the remote terminals 312 are constantly connected to the bus controller 310 while other remote terminals 328 are selectively connected to the bus 314 by a bus repeater unit 315 that includes the repeater 316 and a set of transceiver controller electronics and or software 318, 322, 324. The remote terminals 328 are selectively connected to the bus controller 310 via the minor frame message structure described above.

Within each major frame broadcast on the bus 314, messages are sent to the remote terminals connected to the bus in a similar manner to the typical implementation. However, the sequence of messages includes an additional message addressed to the repeater 316 and sent at the beginning of each minor frame. The additional message is used by the repeater 316 to enable specific output paths or sets of output paths. As each output path may be independently enabled, the same remote terminal address may be re-used on some or all of the repeater output paths. Using this approach, the bus controller 310 may cycle through the various output paths for each minor frame defined above, where each minor frame is mapped to a subset of the remote terminals 312, 328 in the system. As shown in FIG. 4, the enable command sets the subscript (e.g. the column of remote terminals 328) and the address sets the letter designation (e.g. P or Z). In the case of a MIL-STD-1553 bus, the enable may be set through a mode code message where a mode code is a well-known set of codes that encode messages for data bus management.

Using this approach, the number of remote terminals connected to a single serial bus such as the legacy MIL-STD-1553 or SAE AS5652 buses may be arbitrarily expanded, while maintaining compatibility with the standard protocols and electrical specifications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of messaging in a communication system comprising a bus controller and a set of remote terminals each with an address, wherein the bus controller and the set of remote terminals are communicatively interconnected by a serial bus that operates in accordance with a standard protocol that is limited in the number of uniquely addressable remote terminals based at least in part on a message frame that sequences messages into a limited number of time slots, the method comprising:

redefining the message frame into a plurality of major frames;

segmenting each major frame into a set of minor frames, wherein a minor frame included in the set of minor frames addresses a subset of the remote terminals, wherein at least one of the subsets of remote terminals includes a plurality of remote terminals; and sequencing messages into the minor frames such that the minor frames include a set of time-division multiplexed messages, each message in the minor frames including the address of the remote terminal to which the message is directed, and wherein the sequencing messages virtually addresses the remote terminals by combining a time synchronized marker with a local remote terminal address.

2. The method of claim 1 wherein messages to disparate remote terminals having the same address are sequenced to different minor frames.

3. The method of claim 1 wherein each minor frame comprises a predetermined number of time-multiplexed messages.

4. The method of claim 3 wherein the predetermined number is less than or equal to 30.

5. The method of claim 1 wherein the standard protocol is MIL-STD-1553.

6. The method of claim 1 wherein the standard protocol is SAE AS5652.

7. The method of claim 1 wherein the plurality of remote terminals exceeds 31.

8. The method of claim 1 wherein the messages occur repeatedly.

9. The method of claim 1 wherein the messages occur aperiodically.

10. A communication system, comprising:
   a serial bus that operates in accordance with a standard protocol limited in the number of uniquely addressable remote terminals by a message frame that sequences the messages into a limited number of time slots;
   at least one remote terminal coupled to the bus and configured to send and receive messages on the bus;
   a repeater coupled to the bus and configured to send and receive messages on the bus;
   at least one remote terminal coupled to the repeater and configured to send and receive messages on the bus via the repeater; and
   a bus controller coupled to the bus and configured to:
      redefine the message frame into a plurality of major frames each comprising at least one minor frame occupying a unique time slot within the major frame, wherein the at least one minor frame addresses a subset of the remote terminals including two or more remote terminals,
      sequence messages into the at least one minor frame in each major frame, wherein each at least one minor frame comprises a set of time-division multiplexed messages, and include in each message an address field identifying the address of a remote terminal to which the message is directed, wherein the sequencing messages virtually addresses the remote terminals by combining a time synchronized marker with a local remote terminal address,
      add an additional addressing message to each minor frame encoding an output path, wherein the output path and the unique time slot of messages in each minor frame determines which remote terminal is addressed by the message, and
      add an additional message to each major frame encoding an output path for a repeater, wherein the output path encoded in each major frame and the unique time slot in the at least one minor frame determines which remote terminal is addressed by the message.

11. The system of claim 10, wherein the at least one terminal coupled to the bus includes a first and second remote terminal having the same address, and the first and second remote terminals are sequenced to different minor frames.

12. The system of claim 10, wherein each minor frame comprises a predetermined number of time-multiplexed messages.

13. The system of claim 12, wherein the predetermined number is less than or equal to 30.

14. The system of claim 10, wherein the standard protocol is at least one of MIL-STD-1553 or SAE AS5652.

15. The system of claim 10, wherein the additional message encoding an output path is encoded in a mode code.

16. The system of claim 10, wherein the plurality of remote terminals exceeds 31.

\* \* \* \* \*